US012802610B2

(12) United States Patent

Park et al.

(10) Patent No.: US 12,802,610 B2

(45) Date of Patent: Nov. 17, 2026

(54) DISPLAY DEVICE WITH SOURCE DRIVER HAVING MULTIPLE POWER MODES AND METHOD OF DRIVING THE SAME

(71) Applicant: LG Display Co., Ltd., Seoul (KR)

(72) Inventors: Dae Ho Park, Paju-si (KR); Yong Hwa Park, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 19 days.

(21) Appl. No.: 18/990,274

(22) Filed: Dec. 20, 2024

(65) Prior Publication Data

US 2025/0218335 A1 Jul. 3, 2025

(30) Foreign Application Priority Data

Dec. 29, 2023 (KR) ........................ 10-2023-0197298

(51) Int. Cl.
*G09G 3/20* (2006.01)

(52) U.S. Cl.
CPC ............. *G09G 3/2092* (2013.01); *G09G 3/20* (2013.01); *G09G 2300/0842* (2013.01); *G09G 2310/0275* (2013.01); *G09G 2310/08* (2013.01); *G09G 2330/022* (2013.01)

(58) Field of Classification Search
CPC ................... G09G 3/20; G09G 3/2092; G09G 2300/0842; G09G 2310/0275; G09G 2310/08; G09G 2330/022
See application file for complete search history.

(56) References Cited

U.S. PATENT DOCUMENTS

2002/0084965 A1* 7/2002 Park ..................... G09G 3/3666 345/87
2015/0130851 A1* 5/2015 Jeong ................... G09G 3/3688 345/82

FOREIGN PATENT DOCUMENTS

KR 10-0692675 B1 3/2007
KR 10-0864492 B1 10/2008
KR 20140091350 A * 7/2014 ........... G09G 3/3688
(Continued)

*Primary Examiner* — Adam J Snyder

(74) *Attorney, Agent, or Firm* — Birch, Stewart, Kolasch & Birch, LLP

(57) ABSTRACT

A method of driving the display device can include receiving pixel data of an input image, storing the pixel data in a memory, comparing an amount of change between $N^{th}$ (N is a natural number) line data and $(N+1)^{th}$ line data stored in the memory with a reference value, sequentially transmitting the $N^{th}$ line data and the $(N+1)^{th}$ line data to the source driver ICs when the amount of change between the $N^{th}$ line data and the $(N+1)^{th}$ line data is greater than or equal to the reference value, and cutting off driving power of the source driver ICs when the amount of change between the $N^{th}$ line data and the $(N+1)^{th}$ line data is less than the reference value. Accordingly, the current consumption can be reduced.

20 Claims, 14 Drawing Sheets

(56) References Cited

FOREIGN PATENT DOCUMENTS

| | | | | | |
|---|---|---|---|---|---|
| KR | 20170119250 | A | * | 10/2017 | ........... G09G 3/3659 |
| KR | 10-1885807 | B1 | | 8/2018 | |

* cited by examiner

FIG. 5

| | Option1 | Option2 | Option3 | Option4 | Option5 | Option6 | Option7 |
|---|---|---|---|---|---|---|---|
| NUMBER OF BLOCKS | 443 | 32 | 16 | 8 | 4 | 2 | 1 |
| NUMBER OF PIXELS (PER ONE BLOCK) | 1 | 14 | 28 | 56 | 111 | 222 | 443 |

| Vertical Line | REFERENCE FOR DATA SLEW | VOLTAGE DIFFERENCE | LUT |
|---|---|---|---|
| 1st | 2.64us | - | - |
| 2nd | | | |
| ⋮ | | | |
| Xth Line | | 3V | 0 ↔ 255 |
| ⋮ | | ⋮ | ⋮ |
| 3759 Line | | 2.1V | 0 ↔ 205, 1 ↔ 207, ..., 28 ↔ 255 |
| 3760 Line | | 2V | 0 ↔ 200, 1 ↔ 203, ..., 30 ↔ 255 |

DISPLAY DEVICE WITH SOURCE DRIVER HAVING MULTIPLE POWER MODES AND METHOD OF DRIVING THE SAME

CROSS-REFERENCE TO RELATED APPLICATION

This application claims priority to Korean Patent Application No. 10-2023-0197298, filed in the Republic of Korea on Dec. 29, 2023, the disclosure of which is hereby expressly incorporated by reference in its entirety into the present application.

BACKGROUND

1. Field

The present disclosure relates to a display device and a method of driving the same, and more particularly, to a display device that selectively uses single-bank driving or double-bank driving by detecting the occurrence of a data transition in a double-bank type display device, and a method of driving the same.

2. Discussion of the Related Art

With the development of information technology, many related technologies have been developed in the field of display devices for presenting visual information through videos or images. The display device includes a display panel having a plurality of sub-pixels, a driver circuit configured to supply signals for driving the display panel, a power supply unit configured to supply power to the display panel, and the like. The driver circuit includes a gate driver circuit and a data driver circuit configured to supply gate signals and data signals to the display panel, respectively.

In order to drive the display device, data driver integrated circuits (ICs) and gate driver ICs connected to data lines and gate lines, respectively, are mounted at one side or the other side of the display panel in various ways. The display device can drive the data driver ICs and the gate driver ICs by selectively using a single-bank method or a double-bank method depending on the position of each of the driver ICs. In addition, the display device can be divided into a single-bank type display device and a double-bank type display device according to the arrangement form of source driver ICs. Source driver IC chips are disposed only on one edge of the display panel in the single-bank type display device, whereas the source driver IC chips are distributed and disposed on two corresponding edges of the display panel in the double-bank type display device.

SUMMARY OF THE DISCLOSURE

The present disclosure is directed to providing a display device capable of reducing current consumption by selectively using single-bank driving or double-bank driving by detecting the occurrence of a data transition in a double-bank type display device, and a method of driving the same.

The present disclosure is also directed to providing a display device capable of controlling the driving of source driver integrated circuits (ICs) by detecting whether a data transition occurs in pixels of a display panel, and a method of driving the same.

The present disclosure is also directed to providing a display device capable of selectively driving source driver ICs in association with an area with no data transition, and a method of driving the same.

Objectives of the present disclosure are not limited to the above-described objectives, and other objectives that are not described herein will be apparently understood by those skilled in the art from the following description.

According to an aspect of the present invention, there is provided a method of driving a display device, the method including receiving pixel data of an input image, storing the pixel data in a memory, comparing an amount of change between $N^{th}$ line data and $(N+1)^{th}$ line data stored in the memory with a preset reference value where N is a natural number, sequentially transmitting the $N^{th}$ line data and the $(N+1)^{th}$ line data to a source driver integrated circuit (IC) when the amount of change between the $N^{th}$ line data and the $(N+1)^{th}$ line data is greater than or equal to the reference value, and cutting off driving power of the source driver IC when the amount of change between the $N^{th}$ line data and the $(N+1)^{th}$ line data is less than the reference value, wherein the $N^{th}$ line data includes pixel data written to pixels of an $N^{th}$ pixel line of the display panel, and the $(N+1)^{th}$ line data includes pixel data written to pixels of an $(N+1)^{th}$ pixel line of the display panel.

According to another aspect of the present invention, there is provided a display device including a display panel on which a plurality of data lines, a plurality of gate lines, and a plurality of pixels are disposed, a plurality of source driver integrated circuits (ICs) configured to convert received pixel data into a data voltage and supply the data voltage to the data lines, a timing controller configured to receive an input image and transmit the pixel data to the source driver ICs, and a power supply unit configured to output power for driving the source driver ICs under the control of the timing controller, wherein the timing controller is configured to store the pixel data of the input image in a memory, compare an amount of change between $N^{th}$ line data and $(N+1)^{th}$ line data stored in the memory with a preset reference value where N is a natural number, sequentially transmit the $N^{th}$ line data and the $(N+1)^{th}$ line data to the source driver ICs when the amount of change between the $N^{th}$ line data and the $(N+1)^{th}$ line data is greater than or equal to the reference value, and control the power supply unit and cut off driving power of the source driver ICs when the amount of change between the $N^{th}$ line data and the $(N+1)^{th}$ line data is less than the reference value.

Details of other embodiments are incorporated in the detailed description and the drawings.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which:

FIG. 5 is a diagram illustrating a method of setting blocks in detecting whether a data transition has occurred according to one or more embodiments of the present disclosure;

DETAILED DESCRIPTION OF THE EMBODIMENTS

Figure 1:
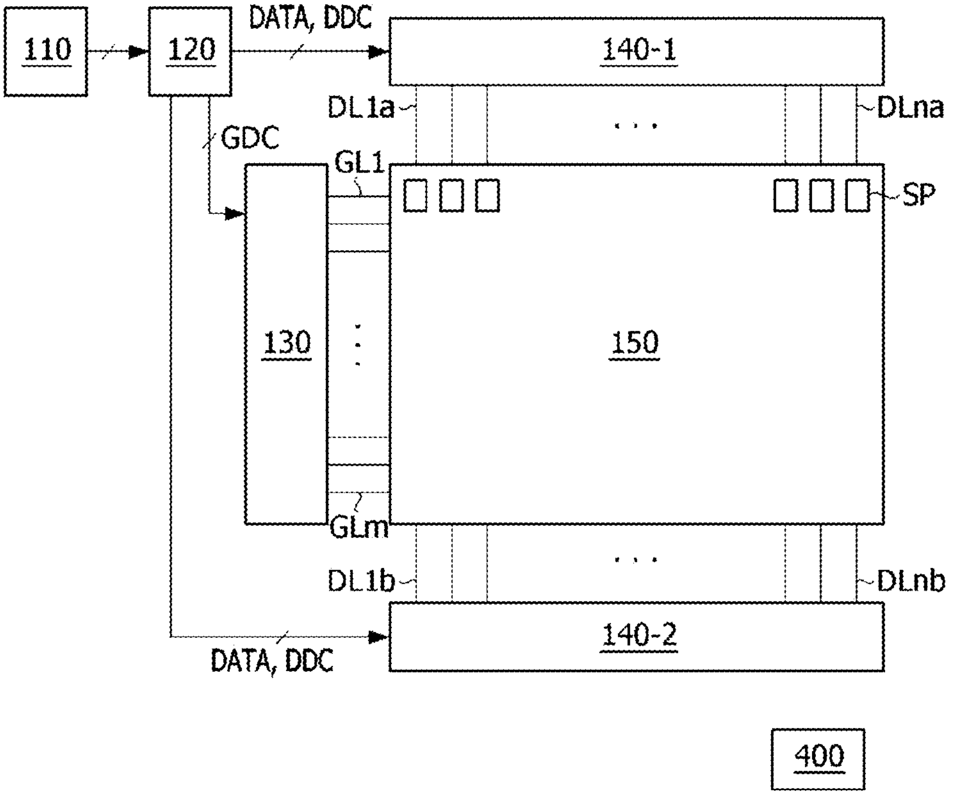
FIG. 1 is a block diagram of a display device according to one or more embodiments of the present disclosure.

Advantages and features of the present invention, and implementation methods thereof will be clarified through the following embodiments described with reference to the accompanying drawings. However, the present invention is not limited to embodiments disclosed below and is implemented in various other forms. The present embodiments make the disclosure of the present invention complete and are provided to completely inform one of ordinary skill in the art to which the present invention pertains of the scope of the disclosure. the present invention is defined only by the scope of the claims.

The figures, dimensions, ratios, angles, numbers, and the like disclosed in the drawings for describing the embodiments of the present invention are merely illustrative and are not limited to details shown in the present invention. Like reference numerals refer to like elements throughout. Further, in describing the present invention, detailed descriptions of well-known technologies will be omitted when it is determined that they can unnecessarily obscure the gist of the present invention. Terms such as “including,” “having,” and “composed of” used herein are intended to allow other elements to be added unless the terms are used with the term “only.” When a component is expressed in the singular form, it can include a case in which the plural form is included unless otherwise explicitly stated.

Components are interpreted as including an ordinary error range even if not expressly stated.

For the description of a positional relationship, for example, when the positional relationship between two parts is described as “on,” “above,” “below,” “next to,” and the like, one or more parts can be interposed therebetween unless the term “immediately” or “directly” is used in the expression.

For the description of a temporal relationship, for example, when a temporal relationship is described as “after,” “subsequently to,” “next,” “before,” and the like, a non-consecutive case can be included unless the term “immediately” or “directly” is used in the expression.

Further, the terms such as N pixel line, N pixel line data, N+1 pixel line, N+1 pixel line data, etc. mean or represent $N^{th}$ pixel line, $N^{th}$ pixel line data, $(N+1)^{th}$ pixel line, $(N+1)^{th}$ pixel line data, etc., where N can be a real number.

The features of various embodiments of the present disclosure can be partially or entirely bonded to or combined with each other. The embodiments can be interoperated and performed in various ways technically and can be carried out independently of or in association with each other.

Hereinafter, a display device and a method of driving the same according to various embodiments of the present disclosure will be described with reference to the accompanying drawings. All the components of each display device according to all embodiments of the present disclosure are operatively coupled and configured.

FIG. 1 is a block diagram of a display device according to one or more embodiments of the present disclosure.

As shown in FIG. 1, the display device according to one or more embodiments of the present invention includes an image supply circuit 110, a timing control circuit 120, a gate driver circuit 130, two data driver circuits 140-1 and 140-2, a display panel 150, and a power supply unit 400.

The image supply circuit 110 image-processes a data signal, and outputs the processed data signal together with a vertical synchronization signal, a horizontal synchronization signal, a data enable signal, a clock signal, and the like. The image supply circuit 110 supplies the vertical synchronization signal, the horizontal synchronization signal, the data enable signal, the clock signal, a data signal DATA, and the like to the timing control circuit 120.

The timing control circuit 120 receives the data signal DATA and the like from the image supply circuit 110 and outputs a gate timing control signal GDC for controlling an operation timing of the gate driver circuit 130 and a data timing control signal DDC for controlling operation timings of the data driver circuits 140-1 and 140-2. The timing control circuit 120 supplies the data signal DATA together with the data timing control signal DDC to the two data driver circuits 140-1 and 140-2. The timing control circuit 120 can be referred to as a timing controller and is not limited by its name as long as it performs the function and operation as described above.

Meanwhile, on a control printed circuit board, various components or elements including the timing control circuit 120 and a level shifter circuit, which can be implemented in the form of an integrated circuit (IC), can be mounted and lines having conductivity can be disposed. The control printed circuit board can be connected to a source printed circuit board by a connection member.

The gate driver circuit 130 outputs gate signals while shifting a gate voltage level in response to the gate timing control signal GDC supplied from the timing control circuit 120. The gate driver circuit 130 includes a level shifter and a shift register.

The gate driver circuit 130 supplies the gate signals to sub-pixels SP included in the display panel 150 through gate lines GL1 to GLm, where m is a real number such as a positive integer. The gate driver circuit 130 can be formed by a gate-in-panel method or in the form of an IC on the display panel 150. A portion formed in the gate-in-panel manner in the gate driver circuit 130 is the shift register.

The data driver circuits 140-1 and 140-2 sample and latch the data signal DATA in response to the data timing control signal DDC supplied from the timing control circuit 120, convert a digital signal into an analog signal to correspond to a gamma voltage, and output the converted analog signal. The data driver circuits 140-1 and 140-2 supply the data signal to the sub-pixels SP included in the display panel 150 through data lines DL1*a* to DLna and DL1*b* to DLnb, where n is a real number such as a positive integer. The data driver circuits 140-1 and 140-2 can be formed in the form of an IC.

Meanwhile, each of source driver ICs can be connected to a bonding pad of the display panel 150 by a tape automated bonding (TAB) method or a chip-on-glass (COG) method, or can be directly disposed on the display panel 150, and can also be disposed by being integrated with the display panel 150. In addition, each source driver IC can be implemented by a chip-on-film (COF) method. In this case, one end of a film on which each source driver IC is mounted is bonded to at least one source printed circuit board and the other end thereof is bonded to the display panel 150.

In a double-bank type display device, the data driver circuits 140-1 and 140-2 are disposed on the display panel 150 at two facing edges. In the double-bank type display device, the source driver ICs are distributed and disposed on one side and the other side of the display panel 150, which are two facing edges on the display panel 150.

The display panel 150 displays an image in response to the gate signal and the data signal output from driver circuits including the gate driver circuit 130 and the data driver circuits 140-1 and 140-2. The display panel 150 is implemented in a flat plate shape, a curved shape, a flexible shape, or the like depending on a material of the substrate. The display panel 150 includes a display area defined by a plurality of pixels and a non-display area in which various signal lines or pads are formed. The plurality of pixels defined by a plurality of data lines DL1 to DLn and a plurality of gate lines GL1 to GLm are disposed in the display area of the display panel 150, and a plurality of sub-pixels SP are included in one pixel.

The sub-pixels SP include a red sub-pixel, a green sub-pixel, and a blue sub-pixel or include a white sub-pixel, a red sub-pixel, a green sub-pixel, and a blue sub-pixel. The sub-pixels SP can have one or more different light-emitting areas according to light-emitting features.

The display area is an area in which an image is displayed, and the plurality of sub-pixels and circuits for driving the plurality of sub-pixels can be disposed in the display area. In addition, the display area can be divided into certain areas, and different images can be displayed for each area. For example, when the display panel 150 is a foldable display panel, the display area is composed of two divided areas using the center of a folded area as a boundary line, so that a different image can be displayed for each area.

The power supply unit 400 can include a charge pump, a regulator, a buck converter, a boost converter, a gamma voltage generation circuit, and the like. The power supply unit 400 adjusts a direct-current (DC) input voltage supplied from a host system to generate power necessary for driving the data driver circuits 140-1 and 140-2, the gate driver circuit 130, and the display panel 150. The power supply unit 400 can output DC voltages such as a gamma reference voltage, a gate-off voltage VGH/VEH, a gate-on voltage VGL/VEL, a pixel drive voltage (high-potential power voltage) ELVDD, a cathode voltage (low-potential power voltage) ELVSS, an initialization voltage Vini, and a reference voltage VREF.

The power supply unit 400 can also generate and output a data driver voltage SVDD and an IC power voltage SVCC, which are power sources to drive the source driver ICs under the control of the timing control circuit 120.

Figure 2:
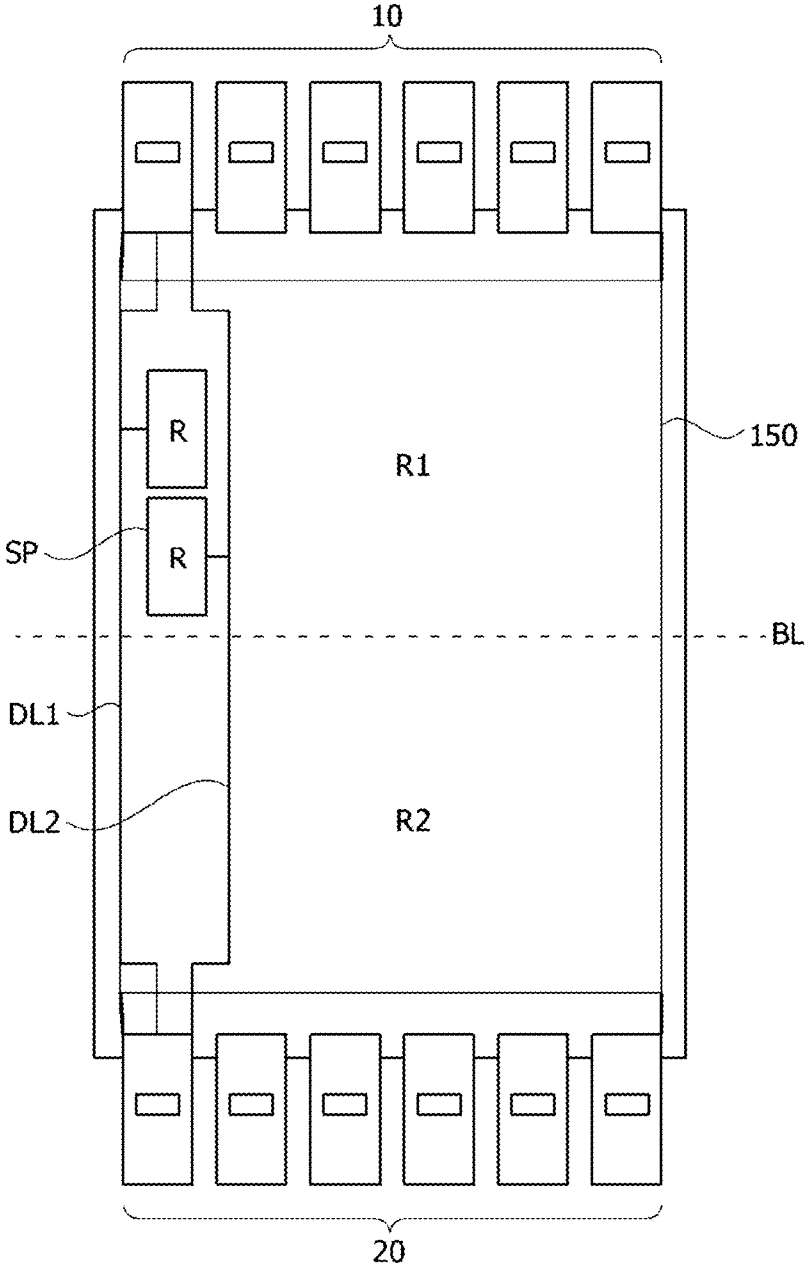
FIG. 2 is diagrams briefly illustrating a data line configuration of the display device according to one or more embodiments of the present disclosure.

FIG. 2 is a diagram briefly illustrating a data line configuration of the display device according to one embodiments of the present disclosure.

Referring to FIG. 2, the display device according to one embodiments of the present disclosure can be a double-bank type display device, and data driver circuits can be disposed on the display panel 150 at two facing edges. In this case, source driver ICs 10 and 20 are distributed and disposed on one side and the other side of the display panel 150, which are two facing edges on the display panel 150. In one embodiment, one side on the display panel 150 can be an upper end side, the other side on the display panel 150 can be a lower end side, and for convenience of description, the source driver ICs disposed at the upper end side can be referred to as first source driver ICs 10, and the source driver ICs disposed at the lower end side can be referred to as second source driver ICs 20.

In one embodiment, the display area of the display panel 150 can include a first area R1, which is an upper portion at one side, and a second area R2, which is a lower portion at the other side. The first area R1 of the upper portion and the second area R2 of the lower portion can be divided by a transverse imaginary reference line BL separating the display area. In one embodiment, the transverse reference line BL can divide the display area in half, and each of the first area R1 and the second area R2 can correspond to an area of one half of the display area.

The data lines from the upper data driver circuit and the data lines from the lower data driver circuit are simultaneously connected to one sub-pixel SP to simultaneously supply data output from one of the first source driver ICs 10 and data output from one of the second source driver ICs 20. As such, the first source driver ICs 10 and the second source driver ICs 20 correspond to each other in one-to-one correspondence so that an output of one of the first source driver ICs 10 and an output of one of the second source driver ICs 20 are supplied to one pixel among the entire pixels.

Figure 3A:
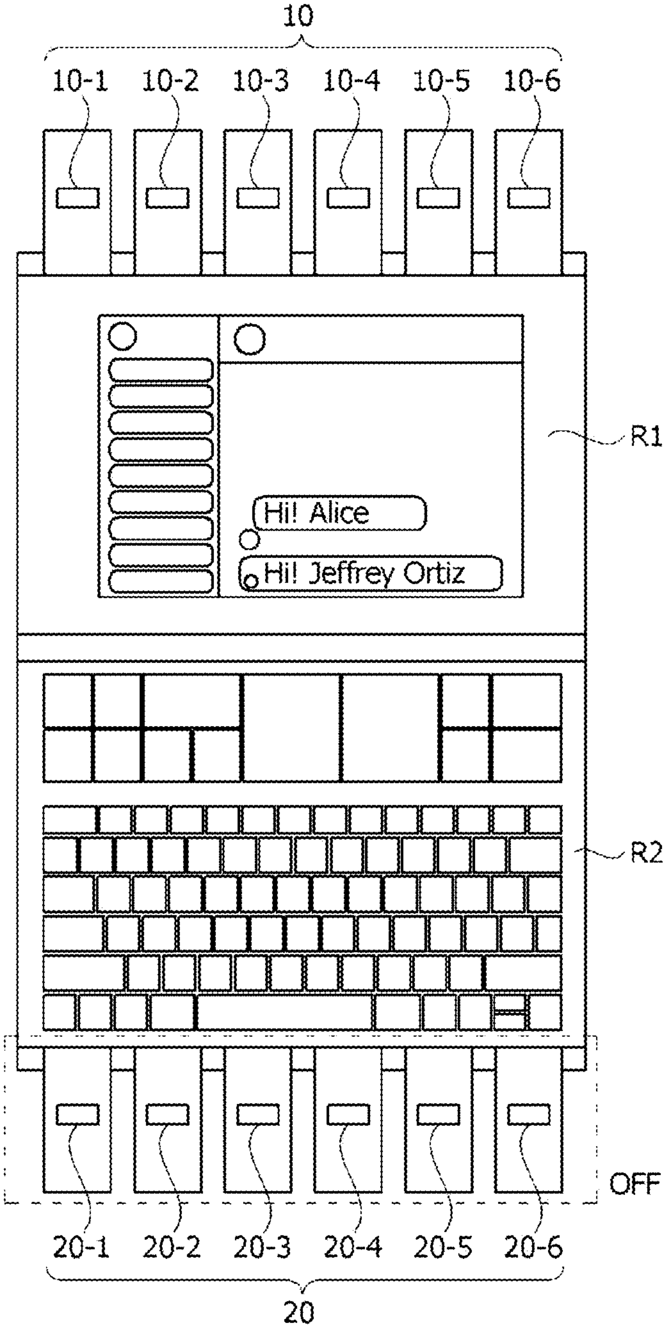
FIG. 3A is a diagram illustrating a method of driving the display device according to one or more embodiments of the present disclosure.

FIG. 3A is a diagram illustrating a method of driving the display device according to one or more embodiments of the present disclosure.

Referring to FIG. 3A, an image displayed in the display area can include a messenger screen displayed in the first area R1, which is an upper portion, and a keyboard screen displayed in the second area R2 that is a lower portion. In one embodiment, the messenger screen in the first area R1 can have relatively large image changes, resulting in a large occurrence of data transitions. On the other hand, the keyboard screen in the second area R2 can have relatively small image changes, resulting in a small occurrence of data transitions. In this case, instead of performing double-bank driving, single-bank driving can be performed by turning off all of second source driver ICs 20-1, 20-2, 20-3, 20-4, 20-5, and 20-6, thereby reducing current consumption.

In addition, in another case, when the screen in the first area R1 has relatively small image changes, resulting in a small occurrence of data transitions, and the screen in the second area R2 has relatively large image changes, resulting in a large occurrence of data transitions, instead of turning off all of the second source driver ICs 20 at a lower end as shown in FIG. 3A, the single-bank driving can be performed by turning off all of the first source driver ICs 10 at an upper end and turning on the source driver ICs at the lower end. In one embodiment, the image change can include a change in a gray level of the image, and this can also be applied in the following description.

Figure 3B:
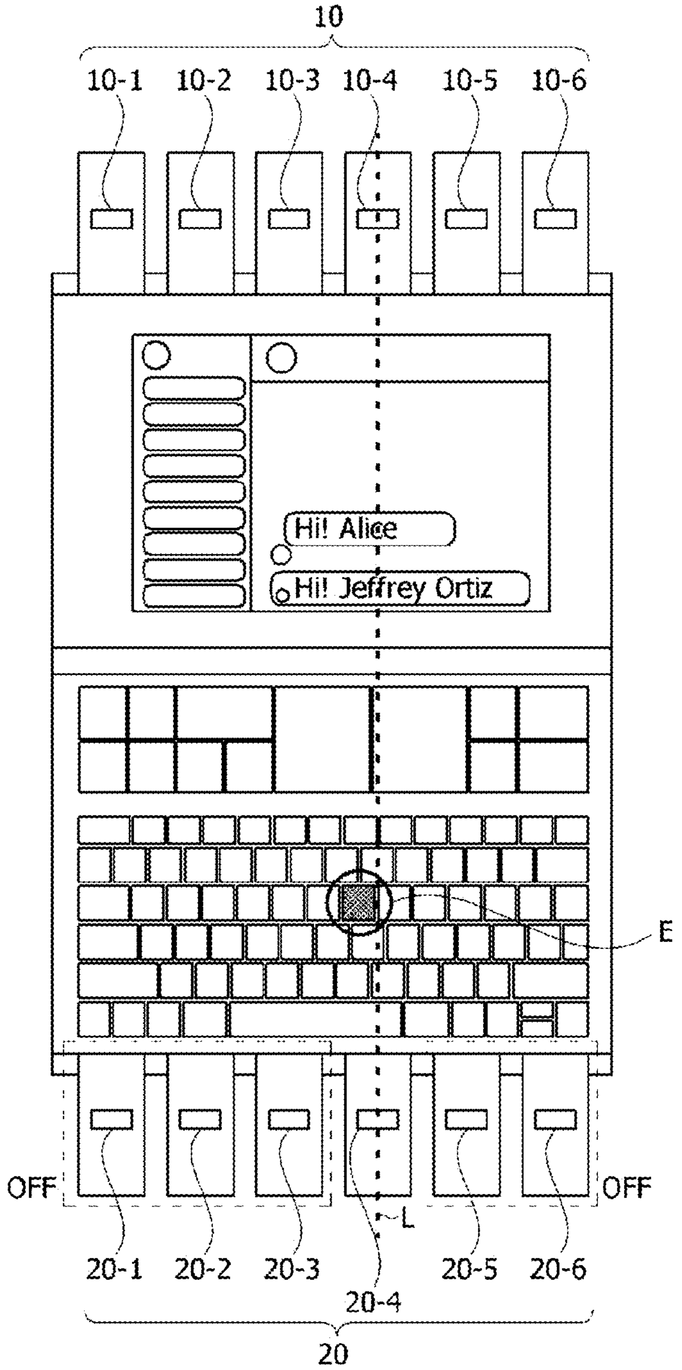
FIG. 3B is a diagram illustrating a method of driving the display device according to another embodiment of the present disclosure.

FIG. 3B is a diagram illustrating a method of driving the display device according to another embodiment of the present disclosure.

In FIG. 3B, similar to FIG. 3A, an image displayed in a display area can include a messenger screen displayed in a first area R1, which is an upper portion, and a keyboard screen displayed in a second area R2 that is a lower portion.

In one embodiment, the messenger screen in the first area R1 and the keyboard screen in the second area R2 may not largely change as a whole, and the keyboard screen in the second area R2 can change due to a touch of one of keyboards, resulting in a large occurrence of data transitions. In this case, one source driver IC 10-4 of the first source driver ICs 10 at the upper end and one source driver IC 20-4 of the second source driver ICs 20 at the lower end, which is associated with a predetermined area including a portion E where a change in the display area has occurred due to the touch event, remain in a turn-on state and are driven in a double-bank manner, and the remaining areas other than the above-described predetermined area can be driven in a single-bank manner by turning off the remaining source driver ICs 20-1, 20-2, 20-3, 20-5, and 20-6 of the second source driver ICs 20 at the lower end, and accordingly, current consumption can be reduced.

The source driver ICs associated with the predetermined area including the portion E in which the change in the display area occurs are determined as the source driver ICs 10-4 and 20-4 placed on a vertical imaginary line L to help intuitive understanding in FIG. 3B, but this is exemplary, and the specific determination method will be described below with reference to FIG. 4.

Figure 3C:
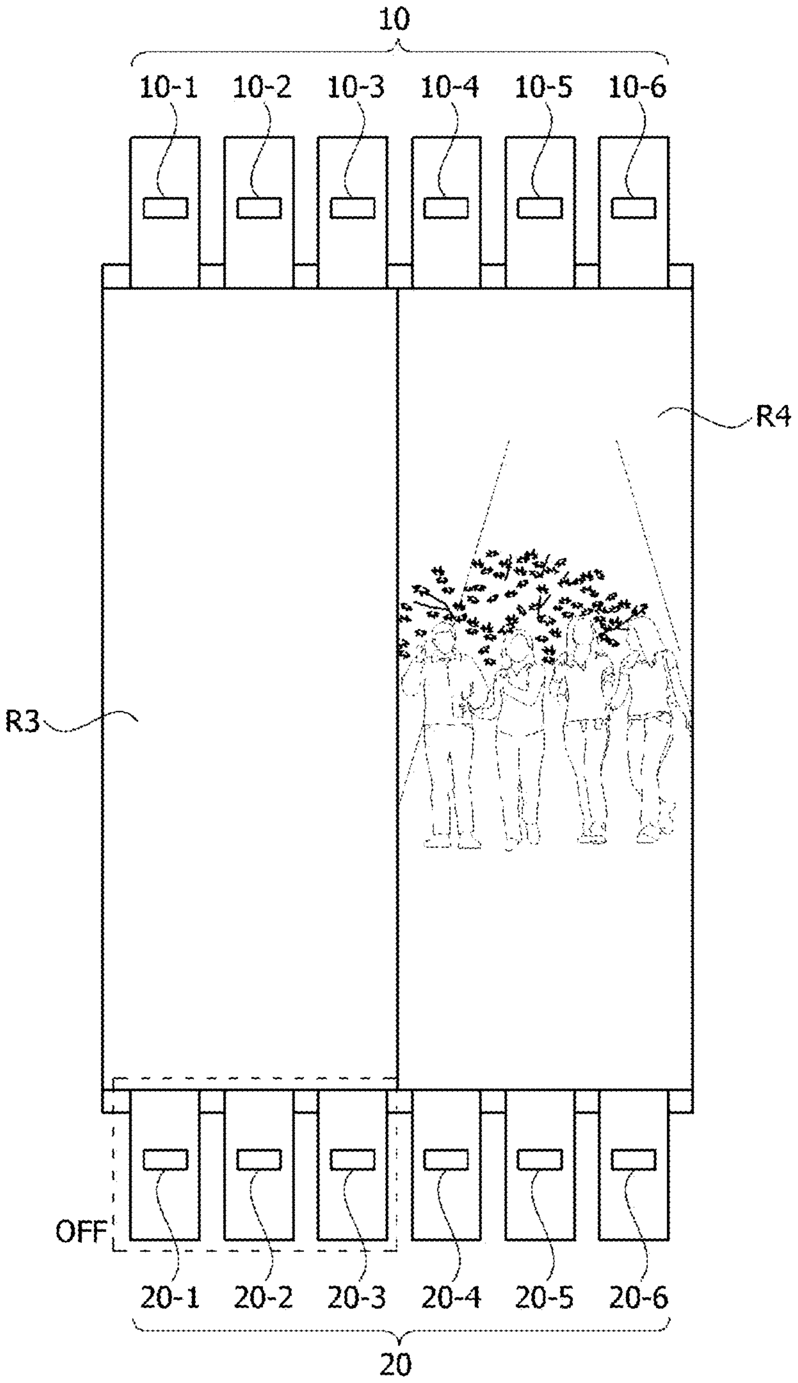
FIG. 3C is a diagram illustrating a method of driving the display device according to still another embodiment of the present disclosure.

FIG. 3C is a diagram illustrating a method of driving the display device according to still another embodiment of the present disclosure.

Referring to FIG. 3C, the display area can include a third area R3 and a fourth area R4 having a boundary line connecting one side at which the first source driver ICs 10 are disposed and the other side at which the second source driver ICs 20 are disposed, i.e., having an area divided in a horizontal direction as shown in FIG. 3C. As an image displayed in the display area, a screen with a solid color pattern can be displayed in the left-side third area R3, and a screen with an active pattern with a dynamically changing image can be displayed in the right-side fourth area R4. In one embodiment, the screen in the third area R3 displays a solid color pattern with little image change, resulting in a small occurrence of data transitions. On the other hand, the screen in the fourth area R4 displays an active pattern with relatively large image changes, resulting in a large occurrence of data transitions. In this case, the first source driver ICs 10-4, 10-5, and 10-6 and the second source driver ICs 20-4, 20-5, and 20-6 associated with the fourth area R4 can remain continuously in a turn-on state and double-bank driving is performed for the fourth area R4, and the second source driver ICs 20-1, 20-2, and 20-3 associated with the third area R3 can be controlled to be turn-off and single-bank driving is performed for the third area R3, thereby reducing the current consumption.

Each of the source driver ICs associated with the third area R3 and the source driver ICs associated with the fourth area R4 is determined to be the source driver ICs disposed in the corresponding area to help intuitive understanding as in FIG. 3B, but this is exemplary and the specific determination method will be described below.

Figure 4:
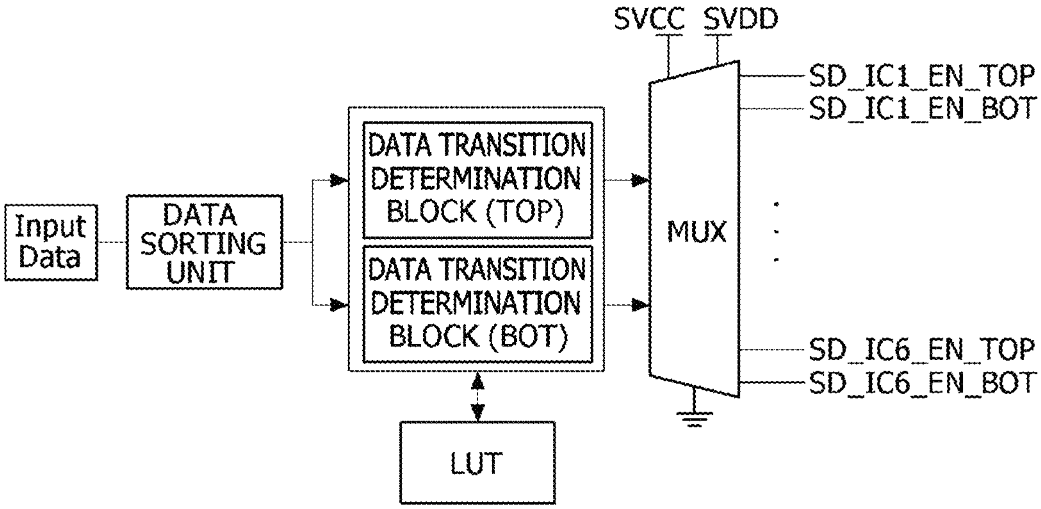
FIG. 4 is a diagram conceptually illustrating a method of detecting whether a data transition has occurred according to one or more embodiments of the present disclosure.

FIG. 4 is a diagram conceptually illustrating a method of detecting whether a data transition has occurred according to one or more embodiments of the present disclosure.

A method of driving the display device according to one embodiment of the present disclosure can include receiving pixel data of an input image, storing the pixel data in a memory, comparing an amount of change between N (N is a natural number) line data and N+1 line data stored in the memory with a preset reference value, sequentially transmitting the N line data and the N+1 line data to the source driver ICs when the amount of change between the N line data and the N+1 line data is greater than or equal to the reference value, and cutting off driving power of the source driver ICs when the amount of change between the N line data and the N+1 line data is less than the reference value.

Further, the N line data can include pixel data written to the pixels of an N pixel line of the display panel, and the N+1 line data can include pixel data written to the pixels of an N+1 pixel line of the display panel. In summary, pieces of pixel data written to the pixels of the N pixel line (i.e., the Nth pixel line) and the N+1 pixel line (i.e., the next (N+1)th pixel line to the Nth pixel line) can be the N line data and the N+1 line data.

More specifically describing with reference to FIG. 4, by receiving the pixel data of the input image, the amount of data change between the line data, for example, the degree of data transition, is detected, and by determining and classifying whether the line of the corresponding pixel corresponds to the first area R1 at the upper portion of the screen or the second area R2 at the lower portion of the screen and comparing the amount of change between the line data in each area with the preset reference value, when the amount of change between the line data is less than the set reference value, the driving power of the corresponding source driver IC is cut off.

In one embodiment, in association with the arrangement form of the source driver ICs as in FIGS. 3A to 3C, the pixels receiving an output of each source driver IC can be pixels included in a zone having a uniform predetermined width In other words, when the arrangement form of the source driver ICs shown in FIGS. 3A to 3C is considered, six zones having a uniform width in the horizontal direction can be assumed in the same manner as in FIG. 3C, and pixels in each zone can receive outputs from corresponding source driver ICs.

In this way, the source driver ICs can respectively correspond to the pixels in the predetermined zone separated in the horizontal direction, and by classifying whether the pixel line corresponds to the upper or lower area of the screen when detecting the amount of data change between the line data, the driving power of the source driver IC can be selectively cut off. An enable signal SD_IC1_EN_TOP or the like is applied to the switching circuit corresponding to the source driver IC, which is determined to continue driving, to supply the data driver voltage SVDD and the IC power voltage SVCC thereto, and the data driver voltage SVDD and the IC power voltage SVCC can be cut off by controlling the switching circuit corresponding to the source driver IC, which is determined to cut off the driving power, with an enable signal.

In one embodiment of the present disclosure, the plurality of source driver ICs are disposed on each of one side and the other side facing each other on the display panel, and the source driver ICs in which the driving power is cut off can be the plurality of source driver ICs disposed on one of one side or the other side.

Referring to FIG. 3A again, the messenger screen in the first area R1 has relatively large image changes, resulting in a large occurrence of data transitions, and the keyboard screen in the second area R2 has relatively small image changes, resulting in a small occurrence of data transitions. In this case, instead of the double-bank driving, the single-bank driving in a state in which the driving power of all of the second source driver ICs 20 is cut off can be performed. For example, unlike FIG. 3A, when the screen in the first area R1 has relatively small image changes, resulting in a small occurrence of data transitions, and the screen in the second area R2 has relatively large image changes, resulting in a large occurrence of data transitions, the single-bank driving can be performed instead of the double-bank driving, and in this case, the display panel can be driven in a state in which the driving power of all of the first source driver ICs 10 is cut off. Accordingly, the current consumption can be reduced.

In one embodiment of the present disclosure, the plurality of source driver ICs are disposed on each of one side and the other side facing each other on the display panel, and the source driver ICs in which the driving power is cut off can be some of the plurality of source driver ICs disposed on one of one side or the other side.

Referring to FIG. 3B again, the messenger screen in the first area R1 and the keyboard screen in the second area R2 can remain unchanged as a whole, and the keyboard screen in the second area R2 can change due to a touch of one of the keyboards, resulting in a large occurrence of data transitions. In this case, the first source driver IC 10-4 and the second source driver IC 20-4 associated with the pixels having a large occurrence of data transitions, such as the portion E in which a change in the display area occurs due to a touch event or the like, can remain continuously in a turn-on state and thus driven in a double-bank manner, and among the first source driver ICs 10-1, 10-2, 10-3, 10-5, and 10-6 and the second source driver ICs 20-1, 20-2, 20-3, 20-5, and 20-6, which are associated with the remaining pixels that do not generate data transitions, the second source driver ICs 20-1, 20-2, 20-3, 20-5, and 20-6 can be cut off from the supply of the driving power. Accordingly, the current consumption can be reduced.

In addition, referring to FIG. 3C again, the screen in the third area R3 displays a solid color pattern with little image change, resulting in a small occurrence of data transitions, and the screen in the fourth area R4 displays an active pattern with relatively large image changes, resulting in a large occurrence of data transitions. In this case, the first source driver ICs 10-4, 10-5, and 10-6 and the second source driver ICs 20-4, 20-5, and 20-6 associated with the pixels with a large occurrence of data transitions in the fourth area R4 can remain continuously in a turn-on state and can be driven in a double-bank manner, and among the first source driver ICs 10-1, 10-2, and 10-3 and the second source driver ICs 20-1, 20-2, and 20-3, which are associated with the remaining pixels in the third area R3 which do not generate data transitions, the second source driver ICs 20-1, 20-2, and 20-3 can be cut off from the supply of the driving power. Accordingly, the current consumption can be reduced.

FIG. 5 is a diagram illustrating a method of setting blocks in detecting whether a data transition has occurred according to one embodiment of the present disclosure.

In one embodiment of the present disclosure, in a method of comparing an amount of change between line data with the preset reference value, the pixels of the display panel that respectively receive outputs from the plurality of source driver ICs can be set in blocks per pixel line, and an amount of change between line data can be compared with a preset reference value for each set block. In addition, the driving power of the source driver IC can be cut off when the amount of change between the line data is below the preset reference value for all of the set blocks.

As described above, since the pixels in the predetermined zone and the source driver ICs correspond to each other, the corresponding source driver ICs can be controlled by comparing the amount of change between the line data for the pixels in one zone with the preset reference value.

More specifically, the blocks are set for the pixels on the pixel line among the pixels for which each source driver IC is responsible for supplying data. FIG. 5 is a table illustrating exemplary block setting cases in relationship to the number of pixels. In one embodiment, the blocks can be set such that each block includes the same number of pixels for the pixels of the pixel line among the pixels for which each source driver IC is responsible for supplying data. Describing with reference to FIG. 5 to help understanding, the number of pixels on the pixel line among the pixels for which each source driver IC is responsible for supplying data can be 443. The blocks can be set in such a manner that the same number of pixels among the 443 pixels are included in each block.

Referring to FIG. 5, the more the number of blocks is set (i.e., closer to Option 1), the more accurate the comparison and determination of the amount of change between the line data with the preset reference value, but the efficiency decreases, but the less the number of blocks is set (i.e., closer to Option 7), the more efficiency of the comparison and determination of the amount of change, but the accuracy decreases. Accordingly, the number of blocks can be appropriately set and utilized as necessary.

After setting the blocks, the amount of change between the line data is calculated for each block. When the amount of change calculated for all the blocks is less than the preset reference value, the driving power of the corresponding source driver IC can be cut off. In one embodiment, the preset reference value can be 60%, and in this case, for all of the blocks, the pixels that meet the condition that the amount of change between line data is less than 60% can be determined as not having the occurrence of a data transition, and the driving power of the corresponding source driver IC can be cut off.

Figure 6A:
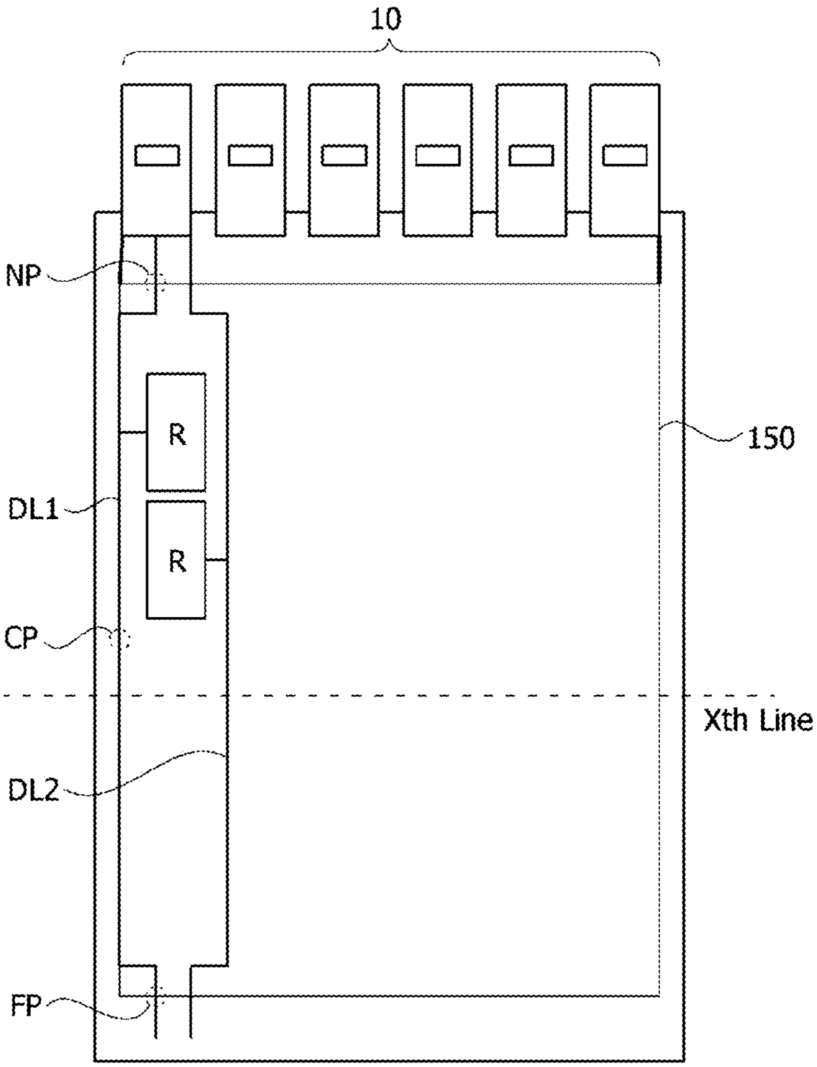
FIGS. 6A to 6C are diagrams for describing a method of using a lookup table in detecting whether a data transition has occurred according to one or more embodiments of the present disclosure.
Figure 6B:
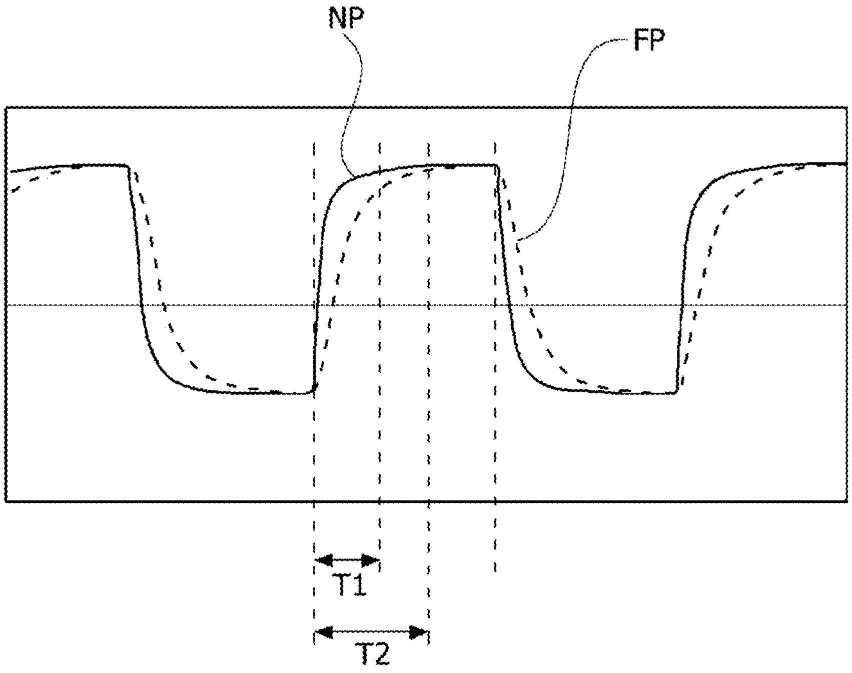
Figure 6C:
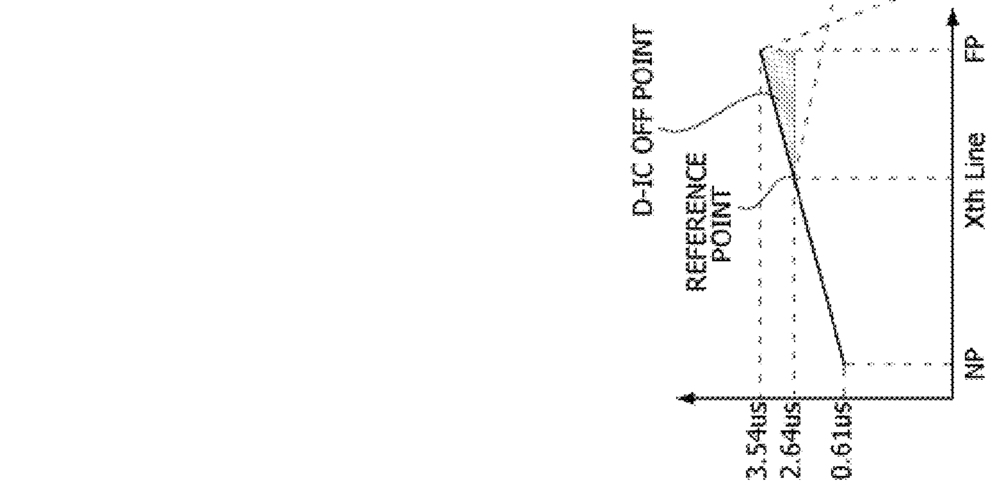

FIGS. 6A to 6C are diagrams for describing a method of using a lookup table in detecting whether a data transition has occurred according to one or more embodiments of the present disclosure.

In one embodiment of the present disclosure, in a method of comparing an amount of change between line data with the preset reference value, an amount of change between the N line data and the N+1 line data can be compared with a lookup table. In addition, the driving power of the source driver IC can be cut off when a value corresponding to the amount of change between the N line data and the N+1 line data is not present in the lookup table.

In one embodiment, values used in a series of processes of calculating the amount of change by comparing magnitudes between line data and comparing the amount of change with values of the preset lookup table can be measured or calculated, taking data slew into consideration and based on the data slew.

Referring to FIG. 6A, in measurement the data slew according to one or more embodiments, when single-bank driving is assumed, there is no difference in uniformity from double-bank driving at a near point NP close to the source driver ICs 10, but uniformity is significantly reduced at a far point FP far from the source driver ICs 10. Accordingly, it is possible to measure data values on the basis of data slew of a center point CP, which can be considered that little change in uniformity occurs, and use the data values to detect the amount of change between line data. In an exemplary embodiment, the data slew at the center point CP can be 2.461 us for a rising edge and 2.313 us for a falling edge, at a time when the amount of change between the line data reaches 98%.

Referring to FIG. 6B, a difference in the rising edge of the data slew between the near point NP and the far point FP from the source driver ICs 10 can be confirmed, and the time at which the amount of change between the data reaches 98% is T1 at the near point NP and T2 at the far point FP, where T1<T2, indicating that the time at which the amount of change between the data reaches 98% is later at the far point FP than at the near point NP. In addition, this phenomenon is similarly generated in the falling edge.

FIG. 6C is a diagram for describing an exemplary method of setting the lookup table, and the specific method of setting the lookup table is as follows, which corresponds to one or more embodiments of setting the lookup table.

Referring to FIG. 6A again, a maximum amount of data change at each of the near point NP and the far point FP, to which data is entered, is measured. Here, the maximum amount of data change refers to the largest value among the amounts of data change when a gray level changes from black to white or white to black.

The data slew graph of FIG. 6B is used to determine pixel lines having a data change amount greater than or equal to the preset reference value. In one embodiment, the preset reference value can be 60%, and a time corresponding thereto can be 2.64 us. The pixel line thus determined is set as an Xth line (i.e., $X^{th}$ line), as shown in FIG. 6A. For reference, the point corresponding to the reference value of 60% can correspond to a time that is 60% of a time of one horizontal period (1H).

All gray level values with a data slew greater than or equal to 60% in the data lines from the Xth line to the end line of the far point FP can be stored in the lookup table. More specifically, the gray level values can be stored in the lookup table based on the voltage difference when the amount of change between the data is above the preset reference value, and in the case of the Xth line, the voltage difference between black and white can be the reference. From an X+1 line, all gray level values greater than or equal to the voltage based on the voltage difference at which the data slew is 60% or more can be stored in the lookup table, for example, assuming that a gray level change at which the data slew at the far point FP is 60% is from 0 to 200, and assuming that a gray level 0 is 5 V and a gray level 200 is 3 V, a voltage difference is 2 V, so that the lookup table can be set in such a way that all pairs of gray levels with a voltage difference of 2 V or more are stored in the lookup table. This can be further understood with reference to the table of FIG. 6C.

When the lookup table is used to compare the amount of change between the line data with the preset reference value, in a method of controlling the source driver ICs according to another embodiment of the present disclosure, when pixel lines to be measured for the amount of change are determined to correspond to lines above the Xth line based on the near point NP, the amount of change between the line data based on the data slew is compared with a preset lookup table to determine whether the amount of change is greater than the preset reference value (e.g., 60%), and when the amount of change is not present in the lookup table, all the source driver ICs at the far point FP side can be turned off. In addition, when the pixel lines to be measured for the amount of change are determined to correspond to lines below the Xth line based on the far point FP, the amount of change between the line data based on the data slew is compared with the preset lookup table to determine whether the amount of change is greater than the preset reference value (e.g., 60%), and when the amount of change is not present in the lookup table, all the source driver ICs at the near point NP side can be turned off. Finally, when the pixel lines to be measured for the amount of change are not both above and below the Xth line based on the near point NP and the far point FP, it indicates that the pixel lines to be compared for the amount of data change are located near the center point CP, in this case, no determination can be made as to whether the driving power of the source driver ICs is cut off.

In the above description of the method of controlling the source driver IC according to another embodiment of the present disclosure, the terms "near point NP" and "far point FP" are used for the purpose of facilitating understanding of the description relating to the Xth line following the description of FIGS. 6A to 6C, and should not be construed as limiting the source driver IC to being disposed only on one side of the display panel, and since the source driver ICs can be disposed on each of facing one side and the other side of the display panel as shown in FIGS. 3A to 3C, the terms "near point NP" and "far point FP" herein should be interpreted to mean one side and the other side of the display panel.

Figure 7:
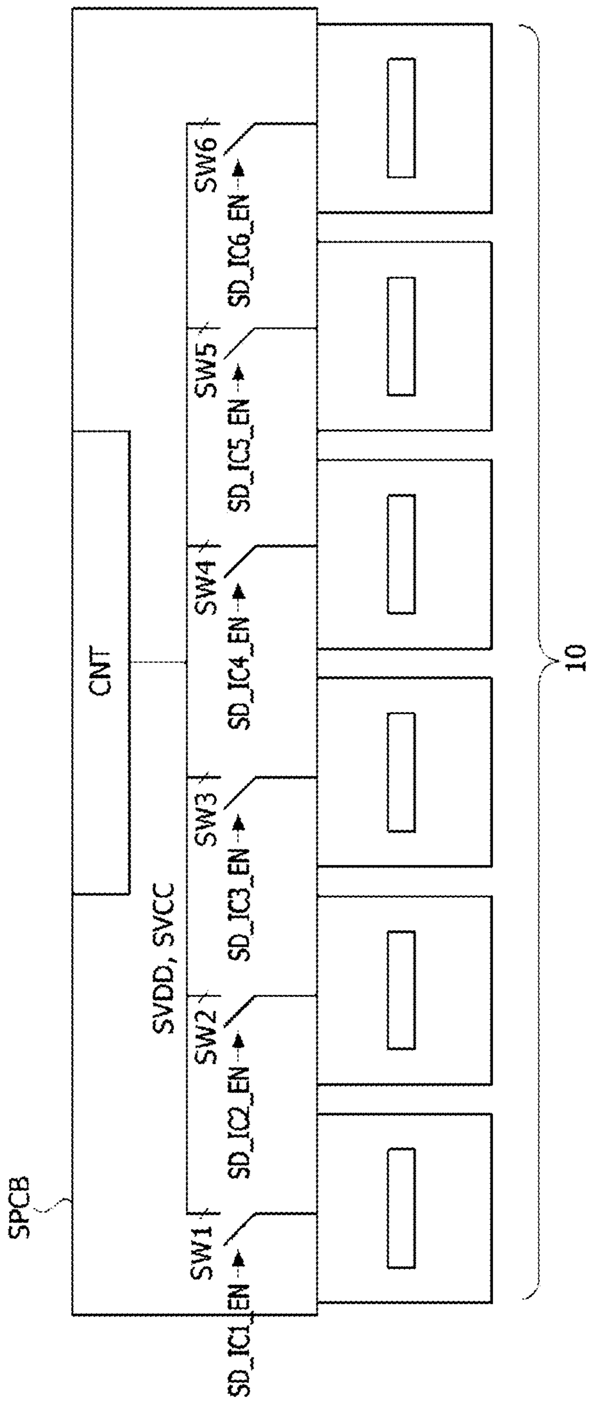
FIG. 7 is a diagram briefly illustrating a switching circuit configured to control source driver integrated circuits (ICs) according to one or more embodiments of the present disclosure.
Figure 8:
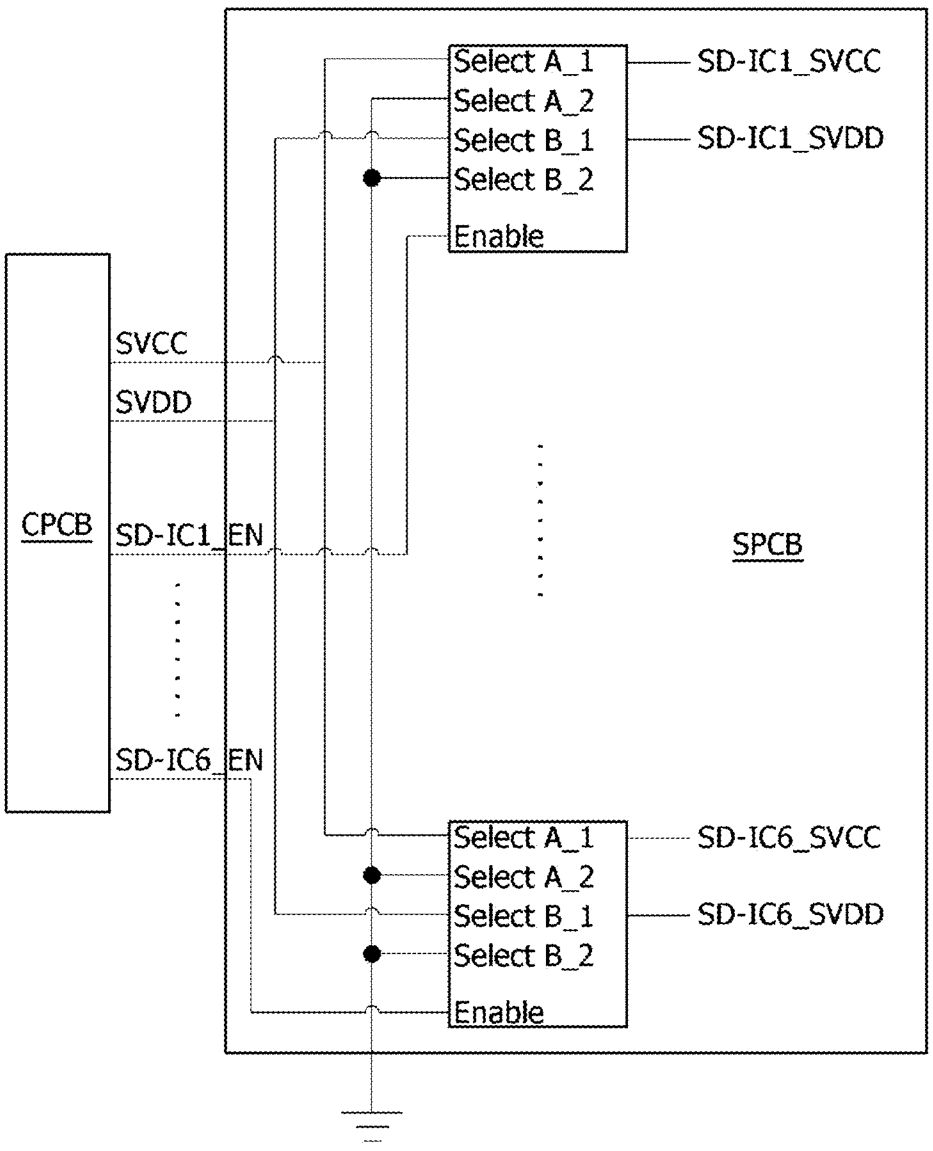
FIG. 8 is a diagram illustrating the switching circuit of FIG. 7 in more detail.

FIG. 7 is a diagram briefly illustrating a switching circuit configured to control the source driver ICs according to one or more embodiments of the present disclosure, and FIG. 8 is a diagram illustrating the switching circuit of FIG. 7 in more detail.

As described above with reference to FIG. 1, the source driver IC can be mounted on a film, one end of the film can be connected to a source printed circuit board SPCB, and the other end thereof can be connected to the display panel 150. In addition, a control printed circuit board CPCB can generate control signals for selecting driving of the source driver ICs and supply the control signals to the source printed circuit board SPCB.

FIG. 7 briefly illustrates the structure of the source printed circuit board SPCB on one side of the display panel, referring to this, turning-on and turning-off the source driver ICs 10 can be controlled through switching circuits SW1 to SW6 implemented on the source printed circuit board SPCB. The switching circuits SW1 to SW6 can control the supply of the data driver voltage SVDD, which is an analog voltage of the source printed circuit board SPCB and is generated in the control printed circuit board CPCB and provided to the source printed circuit board SPCB through a connector CNT, and the IC power voltage SVCC, which is a logic voltage of the source printed circuit board SPCB, to the source driver ICs 10, and once the source driver ICs to be turned off have been determined through the process described above, the source driver ICs are controlled to be turned off by disconnecting the data driver voltage SVDD and the IC power voltage SVCC supplied to the source driver ICs determined to be turned off.

Each of the switching circuits SW1 to SW6 can be individually controlled through enable signals SD-IC1_EN to SD-IC6_EN which are generated in the control printed circuit board CPCB and transmitted to the source printed circuit board SPCB, thereby selectively cutting off the driving power of the source driver ICs 10.

FIG. 8 exemplary illustrates the switching circuit of FIG. 7 in more detail, referring to this, the control printed circuit board CPCB can generate the enable signals SD-IC1_EN to SD-IC6_EN for individually controlling the data driver voltage SVDD, the IC power voltage SVCC, and the switching circuit and transmit the enable signals SD-IC1_EN to SD-IC6_EN to the source printed circuit board SPCB. The source printed circuit board SPCB individually controls the switching circuits for turning on and off each source driver IC by using each of the enable signals SD-IC1_EN to SD-IC6_EN, thereby applying or blocking the data driver voltage SVDD and the IC power voltage SVCC to each source driver IC. Accordingly, the source driver IC can be selectively turned on and off.

Figure 9A:
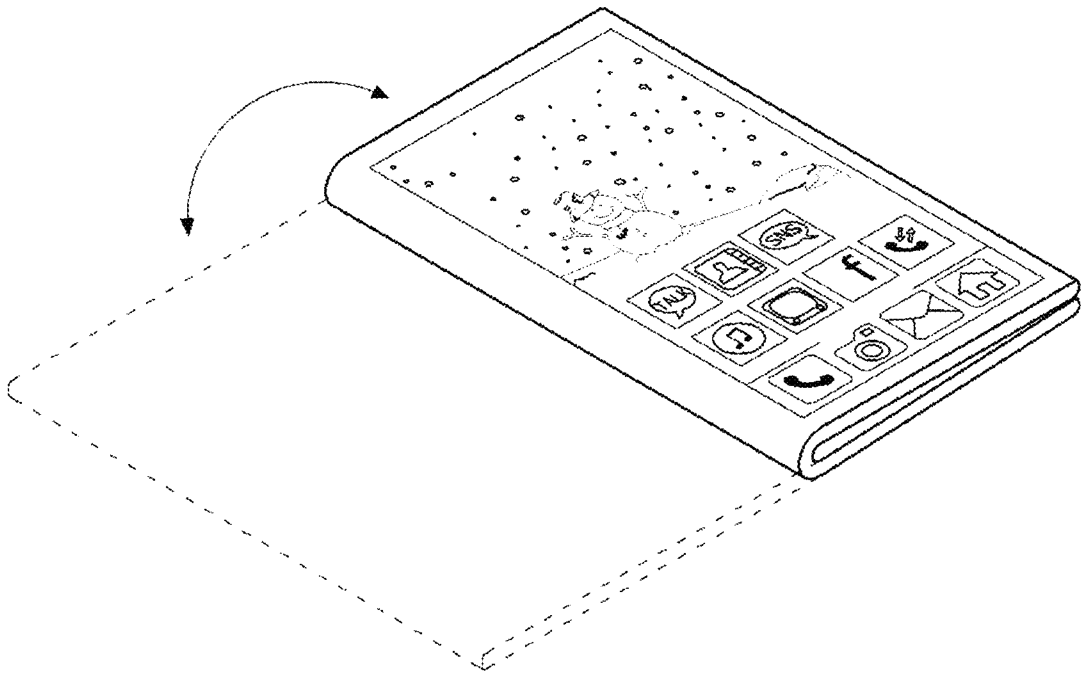
FIGS. 9A and 9B are diagrams illustrating exemplary cases in which the method of driving the display device according to one or more embodiments of the present disclosure is applied to a display device.
Figure 9B:
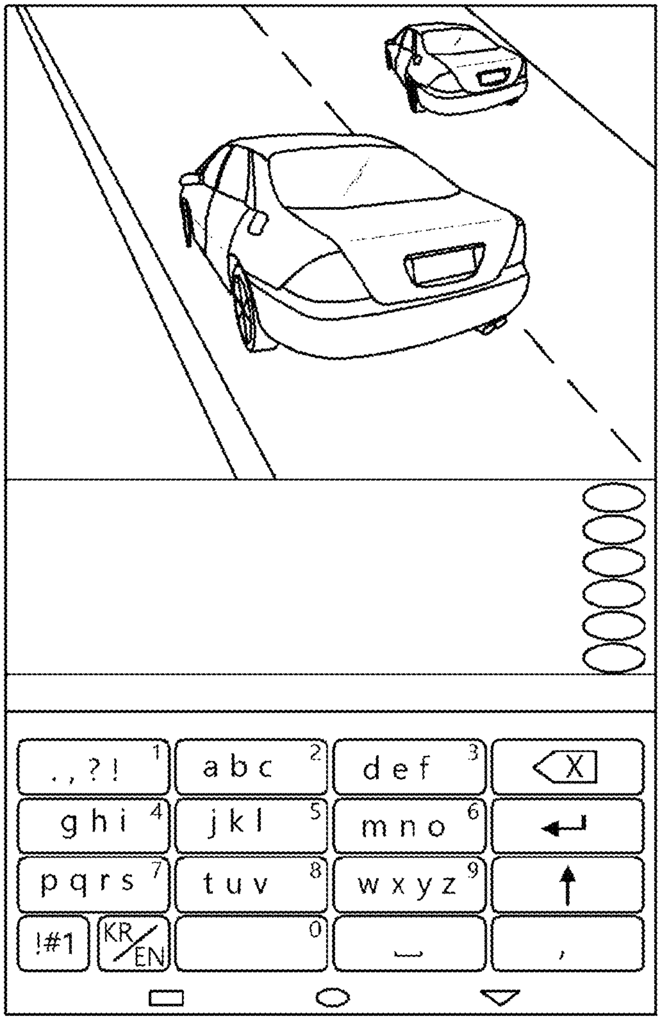

FIGS. 9A and 9B are diagrams illustrating exemplary cases in which the method of driving the display device according to one or more embodiments of the present disclosure is applied to a display device.

In one embodiment, the display device can be a foldable display device, and can remain in a folded state at a specific angle, or can be fully folded or unfolded. The display panel can have flexibility so as to be folded and unfolded along with the folding and unfolding of the foldable display device. In addition, the foldable display device can be in-folding, in which the display device is folded or unfolded such that a display panel is disposed inside, and can be out-folding, in which the display device is folded or unfolded such that the display panel is disposed outside.

When the foldable display device is driven in a folded state, a display area separated by the folding often uses different images for one side of the display area and the other side of the display area. When different images are displayed in different areas, data transitions can occur in a relatively small area, and by turning off the source driver ICs associated with the corresponding area, current consumption can be reduced.

In FIG. 9A, when the foldable display device is driven in an out-folding manner, current consumption of a lower display area, which faces downward and is not displayed, can be reduced by turning off the source driver ICs associated therewith. In addition, in FIG. 9B, when the foldable display device is operated with a split screen, with an upper display area being used for video viewing and a lower display area being used for chatting, the source driver ICs associated with the lower display area with little image change can be turned off to reduce current consumption.

As described above, in the display device and the method of driving the same according to one or more embodiments of the present disclosure, the advantage of reducing current consumption is achieved by diving the display area in a double-bank type display device, and detecting whether a data transition has occurred in the pixels respectively corresponding to the source driver ICs and turning off the corresponding source driver IC, and further, selectively driving the source driver IC, such as driving the entire area in a single-bank type, or driving only a portion of the area in a single-bank type, depending on the type of image being separately driven on the display panel.

According to embodiments of the present disclosure, in a double-bank type display, a display area is separated, and data transitions can be detected for pixels respectively corresponding to source driver integrated circuits (ICs) to perform single-bank driving in which the corresponding source driver IC is turned off, thereby reducing current consumption and enabling low-power driving.

According to embodiments of the present disclosure, it is possible to reduce current consumption by selectively driving source driver ICs, such as driving the entire display panel with a single-bank type or driving only some areas of the display panel with a single-bank type depending on the type of image which are displayed separately by area on the display panel.

According to embodiments of the present disclosure, by setting pixels respectively corresponding to source driver ICs into blocks for each pixel line and detecting whether there is a data transition for each block, the efficiency of detection can be increased while allowing for customization in terms of accuracy.

According to embodiments of the present disclosure, more precise detection can be achieved by using a preset lookup table based on data slew for detecting whether a data transition has occurred.

Effects of the present disclosure are not limited to the above-mentioned effects, and other effects not mentioned will be apparently understood by those skilled in the art from the following description.

While the embodiments of the present invention have been described in detail above with reference to the accompanying drawings, the present invention is not necessarily limited to these embodiments, and various changes and modifications can be made without departing from the technical spirit of the present invention. Accordingly, the embodiments disclosed herein are to be considered descriptive and not restrictive of the technical spirit of the present invention, and the scope of the technical spirit of the present invention is not limited by these embodiments. Accordingly, the above-described embodiments should be understood to be exemplary and not limiting in any aspect. The scope of the present invention should be construed by the appended claims, and all technical spirits within the scopes of their equivalents should be construed as being included in the scope of the present invention.

What is claimed is:

1. A method of driving a display device including a display panel, the method comprising:

receiving pixel data of an input image;

storing the pixel data in a memory;

comparing an amount of change between $N^{th}$ line data and $(N+1)^{th}$ line data stored in the memory with a reference value, where N is a natural number;

sequentially transmitting the $N^{th}$ line data and the $(N+1)^{th}$ line data to a source driver integrated circuit (IC) when the amount of change between the $N^{th}$ line data and the $(N+1)^{th}$ line data is greater than or equal to the reference value; and cutting off driving power supplied to the source driver IC when the amount of change between the $N^{th}$ line data and the $(N+1)^{th}$ line data is less than the reference value, wherein the $N^{th}$ line data includes pixel data written to pixels of an $N^{th}$ pixel line of the display panel, and wherein the $(N+1)^{th}$ line data includes pixel data written to pixels of an $(N+1)^{th}$ pixel line of the display panel.

2. The method of claim 1, wherein a plurality of source driver ICs are disposed at each of two facing sides of the display panel, and wherein the cutting off the driving power of the source driver IC includes cutting off driving power of the plurality of source driver ICs disposed at one of the two facing sides of the display panel.

3. The method of claim 2, wherein a display area of the display panel includes a first area at one of the two facing sides and a second area at the other of the two facing sides, and wherein different images are displayed in the first area and the second area, respectively.

4. The method of claim 1, wherein a plurality of source driver ICs are disposed at each of two facing sides of the display panel, and wherein the cutting off the driving power of the source driver IC includes cutting off driving power of some of the plurality of source driver ICs disposed at one of the two facing sides of the display panel.

5. The method of claim 4, wherein a display area of the display panel includes a third area and a fourth area that have a boundary line connecting the facing sides of the display panel, and wherein different images are displayed in the third area and the fourth area, respectively.

6. The method of claim 1, wherein a plurality of source driver ICs are disposed on the display panel, wherein the comparing the amount of change between the $N^{th}$ line data and the $(N+1)^{th}$ line data with the reference value includes:

setting a group of pixels of the display panel that receive outputs from one of the plurality of source driver ICs into blocks by each of pixel lines of the group of pixels; and comparing an amount of change between line data for each of the set blocks with the reference value, and wherein the cutting off the driving power of the source driver IC is performed when the amount of change between the line data of all the set blocks is less than the reference value.

7. The method of claim 6, wherein each of the blocks is set to include a same number of pixels.

8. The method of claim 1, wherein the comparing the amount of change between the $N^{th}$ line data and the $(N+1)^{th}$ line data with the reference value includes comparing the amount of change between the $N^{th}$ line data and the $(N+1)^{th}$ line data with a lookup table, and wherein the cutting off the driving power of the source driver IC is performed when a value corresponding to the amount of change between the $N^{th}$ line data and the $(N+1)^{th}$ line data is not present in the lookup table.

9. The method of claim 8, wherein all pairs of gray level values are stored in the lookup table, and wherein the pairs of gray level values are obtained by:

measuring a maximum amount of data change of one end portion of the display panel;

determining a pixel line in which an amount of data change is greater than or equal to the reference value, based on the maximum amount of data change; and having voltage differences which are greater than or equal to the reference value from a next pixel line of the determined pixel line to a last pixel line, based on the maximum amount of data change.

10. The method of claim 9, wherein the maximum amount of data change and the reference value are values based on data slew.

11. A display device comprising:

a display panel on which data lines, gate lines, and pixels are disposed;

source driver integrated circuits (ICs) configured to convert received pixel data into a data voltage and supply the data voltage to the data lines;

a timing controller configured to receive an input image and transmit the pixel data to the source driver ICs; and a power supply unit configured to output power for driving the source driver ICs under control of the timing controller, wherein the timing controller is configured to:

store the pixel data of the input image in a memory;

compare an amount of change between $N^{th}$ line data and $(N+1)^{th}$ line data stored in the memory with a reference value, where N is a natural number;

sequentially transmit the $N^{th}$ line data and the $(N+1)^{th}$ line data to the source driver ICs when the amount of change between the $N^{th}$ line data and the $(N+1)^{th}$ line data is greater than or equal to the reference value; and control the power supply unit and cut off driving power supplied to the source driver ICs when the amount of change between the $N^{th}$ line data and the $(N+1)^{th}$ line data is less than the reference value.

12. The display device of claim 11, wherein the source driver ICs are disposed at each of two facing sides of the display panel, and wherein the source driver ICs for which the driving power is cut off are the source driver ICs disposed at one of the two facing sides of the display panel.

13. The display device of claim 12, wherein a display area of the display panel includes a first area of and one of the two facing sides and a second area of the other of the two facing sides, and wherein different images are displayed in the first area and the second area, respectively.

14. The display device of claim 11, wherein the source driver ICs are disposed at each of two facing sides of the display panel, and wherein the source driver ICs for which the driving power is cut off are some of the source driver ICs disposed at one of the two facing sides of the display panel.

15. The display device of claim 14, wherein a display area of the display panel includes a third area and a fourth area that have a boundary line connecting the two facing sides of the display panel, and wherein different images are displayed in the third area and the fourth area, respectively.

16. The display device of claim 11, wherein the amount of change between the $N^{th}$ line data and the $(N+1)^{th}$ line data is compared with the reference value by:

setting a group of pixels of the display panel that receive outputs from one of the source driver ICs into blocks by each of pixel lines of the group of pixels; and comparing an amount of change between line data for each of the set blocks with the reference value, and wherein the driving power of the source driver IC is cut off when the amount of change between the line data of all the set blocks is less than the reference value.

17. The display device of claim 16, wherein each of the blocks is set to include a same number of pixels.

18. The display device of claim 11, wherein the amount of change between the $N^{th}$ line data and the $(N+1)^{th}$ line data is compared with the reference value by comparing the amount of change between the $N^{th}$ line data and the $(N+1)^{th}$ line data with a lookup table, and wherein the driving power of the source driver IC is cut off when a value corresponding to the amount of change between the $N^{th}$ line data and the $(N+1)^{th}$ line data is not present in the lookup table.

19. The display device of claim 18, wherein all pairs of gray level values are stored in the lookup table, and wherein the pairs of gray level values are obtained by:

measuring a maximum amount of data change of one end portion of the display panel;

determining a pixel line in which an amount of data change is greater than or equal to the reference value, based on the maximum amount of data change; and having voltage differences which are greater than or equal to the reference value from a next pixel line of the determined pixel line to a last pixel line, based on the maximum amount of data change.

20. The display device of claim 19, wherein the maximum amount of data change and the reference value are values based on data slew.

* * * * *